US012691928B2

(12) United States Patent　　　(10) Patent No.:　US 12,691,928 B2
Laure et al.　　　(45) Date of Patent:　Jul. 28, 2026

(54) ELECTRIC APPARATUS FOR A VEHICLE

(71) Applicant: Hella GmbH & Co. KGaA, Lippstadt (DE)

(72) Inventors: Frédéric Laure, Fontenilles (FR); Alain Conte-Tisnerat, Tournefeuille (FR)

(73) Assignee: Hella GmbH & Co. KGaA, Lippstadt (DE)

( * ) Notice: Subject to any disclaimer, the term of this patent is extended or adjusted under 35 U.S.C. 154(b) by 876 days.

(21) Appl. No.: 17/812,307

(22) Filed: Jul. 13, 2022

(65) Prior Publication Data

US 2022/0348251 A1　　Nov. 3, 2022

Related U.S. Application Data

(63) Continuation of application No. PCT/EP2020/051008, filed on Jan. 16, 2020.

(51) Int. Cl.
B62D 5/04　　　(2006.01)
(52) U.S. Cl.
CPC ................................. B62D 5/0406 (2013.01)
(58) Field of Classification Search
CPC ...... B62D 5/0406; B62D 5/0403; B62D 5/04; B62D 5/0409
See application file for complete search history.

(56) References Cited

U.S. PATENT DOCUMENTS

| | | | | |
|---|---|---|---|---|
| 6,577,030 B2 * | 6/2003 | Tominaga | .............. | H02K 11/33 |
| | | | | 310/68 B |
| 8,338,998 B2 * | 12/2012 | Yamasaki | ............... | H01L 25/11 |
| | | | | 310/71 |
| 9,780,619 B2 * | 10/2017 | Fujimoto | ............... | H02K 11/33 |
| 10,214,233 B2 * | 2/2019 | Yamasaki | ............ | B62D 5/0463 |
| 10,651,708 B2 * | 5/2020 | Iwasaki | ............. | H05K 7/14322 |
| 10,797,570 B2 * | 10/2020 | Yatsugi | ............... | H05K 5/0026 |
| 10,906,577 B2 * | 2/2021 | Urimoto | ............... | H02K 11/33 |
| 11,070,158 B2 * | 7/2021 | Oiwa | .................... | H02P 29/028 |
| 2002/0060105 A1 | 5/2002 | Tominaga et al. | | |
| 2011/0018374 A1 | 1/2011 | Yamasaki et al. | | |
| 2016/0065030 A1 | 3/2016 | Fujimoto | | |
| 2019/0016371 A1 | 1/2019 | Urimoto et al. | | |
| 2019/0103788 A1 | 4/2019 | Iwasaki | | |
| 2019/0356259 A1 | 11/2019 | Oiwa | | |

FOREIGN PATENT DOCUMENTS

| | | |
|---|---|---|
| WO | 2016125700 A1 | 8/2016 |
| WO | 2019073594 A1 | 4/2019 |

* cited by examiner

*Primary Examiner* — Valentin Neacsu
*Assistant Examiner* — Michael R Stabley
(74) *Attorney, Agent, or Firm* — Husch Blackwell LLP

(57)　　　　　　ABSTRACT

An electric apparatus is provided for an electric power steering system of a vehicle. The electric apparatus includes at least one electric machine and an electronic arrangement at least for controlling the at least one electric machine. The at least one electric machine and the electronic arrangement form a single common assembly unit for being mounted on the vehicle.

10 Claims, 3 Drawing Sheets

ELECTRIC APPARATUS FOR A VEHICLE

CROSS REFERENCE

This application claims priority to and is a continuation of PCT Application No. PCT/EP2020/051008, filed Jan. 16, 2020, the entirety of which is hereby incorporated by reference.

FIELD OF THE INVENTION

The invention concerns an electric apparatus for an electric power steering system of a vehicle. Such an apparatus can comprise at least one electric machine and an electronic arrangement at least for controlling the at least one electric machine. The at least one electric machine and the electronic arrangement can form a single common assembly unit for being mounted on the vehicle.

BACKGROUND OF THE INVENTION

Known electric power steering (EPS) systems use an electric motor to assist the handle operation (steering) of a driver of a vehicle. For instance, sensors can detect the position and torque of the steering column, and a computer module can apply assistive torque via the motor, which connects to either the steering gear or steering column. This allows varying amounts of assistance to be applied depending on driving conditions. A reliable EPS system is based on optimized electronic arrangement, which together with the motor can form a powerpack arrangement for the EPS system. The electronic arrangement can be provided in the form of an electronic control unit (ECU), which can be arranged on the top of the motor.

Each of the documents US 2002/0060105 A1, US 2016/0065030 A1, US 2019/0103788 A1 and WO 2016/125700 A1 disclose a generic electrical apparatus for an EPS system of a vehicle.

However, it can be a drawback of known EPS systems and the corresponding powerpack that the design of the assembly unit is less flexible and requires a lot of installation space.

BRIEF SUMMARY OF THE INVENTION

It is therefore an object of the invention to at least partially eliminate the above-mentioned disadvantages. It is an object to downsize the entire assembly unit of the electronic arrangement and the motor.

According to an aspect of the invention, the at least one electric machine and the electronic arrangement (together) form a single common assembly unit for being mounted on the vehicle. In this way, the apparatus can be easily and quickly installed on the vehicle. For example, the entire electronic arrangement, particularly together with the electric machine, can be encapsulated by covers and/or a housing of the electric apparatus. The assembly unit can also be referred to as powerpack.

The object of the invention is particularly solved by the fact that the electronic arrangement is arranged on at least two different sides of the electric apparatus, in particular the electric machine of the electric apparatus. This has the advantage that a compact and flexible design of the assembly unit can be used that can be flexibly installed on the vehicle. The higher degree of design freedom entails a flexible and space-saving adaptability of the electric apparatus to the situation in the vehicle. For the arrangement on the different sides, the electronic arrangement can particularly be connected to a housing of the electric machine. However, it is also possible that the electronic arrangement is not connected to the electric machine and/or arranged at a distance from the electric machine and/or heat conductively connected to the housing of the electric machine.

The assembly unit can be mounted on the vehicle in such a way that the assembly unit is fixed inside the vehicle and brought into data connection with electronics like a main electric unit of the vehicle. For fastening of the assembly unit, common fastening means as snap-in means or screws can be used. For the data connection, it can be provided that a data interface of the inventive apparatus is connected to a bus system or the like of the vehicle. Particularly, a connector plate of the apparatus can provide a data communication interface to the electronic arrangement.

The electric apparatus can be configured with a highly integrated and (particularly redundant) electromechanics design. In other words, the design of the electric apparatus can be very compact to provide the power electronic and power mechanic function for the EPS system. In addition, the electric components of the inventive apparatus can be provided redundantly, to at least double the function of the electric apparatus.

The invention is particularly based on the idea to distribute the command and power electronics functions around the motor and not to have an additional ECU on the top of the motor. This way the inventive apparatus can be very compact and easier to integrate into the system or the vehicle. The inventive apparatus can therefore be understood as a very compact powerpack which is allows for an easy and fast assembly on the vehicle.

Preferably, it is provided that the electric apparatus is configured as an electric power steering apparatus for assisting a handle operation of a driver of the vehicle. In particular, the (at least one) electric machine is designed to generate a steering assist force for assisting the handle operation. Furthermore, the electronic arrangement can be designed to control the generation of the assisting force. In other words, the inventive apparatus can be specifically dedicated for providing steering force for assisting a driver of the vehicle. To this end, the electric machine(s) can have a motor shaft through which the steering assist force can be applied to a steering shaft of the motor vehicle.

It may also be provided that the electronic arrangement is distributed around the electric machine within the electric apparatus. In other words, the parts of the electronic arrangement can be arranged on different sides around the at least one electric machine. However, the parts of the electronic arrangement are still part of the assembly unit, and particularly encapsulated by a common housing or common covers. In this respect, the electronic arrangement is located inside the electric apparatus, for example within a housing (built by the covers) of the electric apparatus.

The arrangement of the electronic arrangement in a distributed manner around the electric machine(s) can have several advantages. The absence of the restriction that every electronic part is arranged on only one common side of the electric machine can provide a higher level of capacity. Also, a connector plate of the electric apparatus can be provided that can be fluidly placed anywhere around the electric apparatus.

Advantageously, a mechanical part of the electric machine can be used as heatsink, so that no dedicated heatsink is necessary for heat dissipation for the electronics.

More than one heatsink can furthermore be used to divide the thermal power to be dissipated in two distinct areas of the electric apparatus.

It is also conceivable that the at least one electric machine comprises at least two electric machines to redundantly provide a steering assist force for providing steering assistance. In other words, at least two redundant electric machines can be part of the electric apparatus, which provide the same function redundantly. To this end, the electronic arrangement can comprise redundant functional components for providing at least one of the following functions:

Controlling the electric machines for the generation of the steering assist force by at least one control circuit, Supplying electric power to the electric machines by at least one power circuit, Monitoring the electric machines by at least one motor position sensor.

With this respect, each of the control circuit and/or the power circuit and/or the motor position sensor are regarded as the functional component, so that each of these components can be provided at least twice to enable a redundant functionality. This allows for a more reliable and safe operation of the electric power steering system.

The control circuit and/or the power circuit can be at least partially arranged on a corresponding circuit board. Every function component can be integrated into the inventive electric apparatus and therefore be encapsulated by a common housing.

Furthermore, it is conceivable that the redundant functional components of the electronic arrangement comprise first and second components. The first components can be configured to provide the (above-mentioned) functions for a first electric machine of the redundant electric machines. The second components can be configured to provide the (above-mentioned) functions for a second electric machine of the redundant electric machines. Therefore, a clear functionally associated arrangement can be provided around the electrical machines. For redundancy reasons, the first and second components can be configured identically but only arranged on the different sides. The first components can be arranged on a first side of the different sides adjacent to the first electric machine and the second components can be arranged on a second side of the different sides adjacent to the second electric machine. This allows to achieve a compact design, for example by using short signal lines.

Preferably, it can be provided that at least one mechanical part of the electric machine, particularly a motor housing, is configured to provide a heatsink, particularly for the electronic arrangement. Therefore, this mechanical part can provide at least two functionalities, as a stabilization and easy handling for the electric machine and the heat dissipation for the parts of the electronic arrangement. It should be emphasized that advantageously not a dedicated or separate heatsink is used, but rather the same part is used, for instance as housing and heatsink, and therefore with two functionalities. In this way, the heatsink function can be provided at least partially or exclusively by the mechanical part.

It can be provided that at least one heatsink for the electronic arrangement is distributed around the electric machine for dividing a heat dissipation at least or exactly in two distinct areas of the electric apparatus on the different sides. In other words, thermal power to be dissipated can be divided in two distinct areas on the different sides by the distributed heatsink. This enables an implementation of a reliable heat dissipation strategy. The two areas can be part of the electric apparatus within a housing of the electric apparatus.

Additionally, it can be possible that the electric apparatus further comprises at least one connector unit, particularly a connector plate, for providing an electric interface to the electronic arrangement, preferably for at least controlling the electric machine.

Furthermore, the at least one connector unit, particularly plate, can be arranged on at least or exactly one third side which differs to the different sides. In case of at least two electric machines, it is possible that for each electric machine a corresponding connector unit is provided. The connector plate can comprise one or more electric connectors for a signal and/or data exchange between a vehicle electronics (outside the electric apparatus) like a main electric unit and the electronic arrangement.

It can be conceivable that the electric apparatus further comprises a housing surrounding at least the electric machine and the electronic arrangement for forming the assembly unit. This enables an easy and reliable way to handle and mounting of the assembly unit.

It is optional that the at least one electric machine, particularly at least one electric motor, is arranged in between the two different sides. In other words, the electric machine can be sandwiched between these sides. The two sides can be designed as opposite sides of the electric machine, particularly along a motor shaft axis or orthogonal to this axis. Preferably, the electric machine is sandwiched in between two circuit arrangements (for example printed circuit boards) of the electronic arrangement on these sides. Each of the circuit arrangements can comprise control components and/or power components. For instance, each of the circuit arrangements can comprise at least one control board (control printed circuit board) and/or at least one power board (power printed circuit board).

In case of at least two electric machines, the electric machines can be interconnected and/or arranged directly next to each other. The electronic arrangement can be arranged on the different sides by the fact that a first part of the electronic arrangement is located in a first area at the first side and a second part of the electronic arrangement is located in a second area at the second side. The first and second sides are accordingly the mentioned opposite sides.

The first and second sides and/or areas can be arranged outside the at least one electric machine, and particularly form an outer region of the electric apparatus.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

In the following figures, the identical reference signs are used for the same technical features, even for different embodiments.

Figure 1:
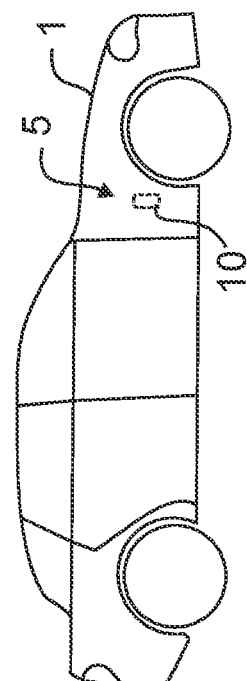
FIG. 1 is a schematic side view of a vehicle with an inventive electric apparatus.
Figure 1:

FIG. 1 shows a vehicle 1 with an inventive electric apparatus 10 for an electric power steering system 5 of the vehicle 1. As visualized by dashed lines, the electric apparatus 10 can be fully integrated into the vehicle 1. To this end, an assembly process can be used that includes steps of fastening the apparatus 10 to the vehicle 1 and establishing an electrical connection between the electronics infrastructure of the vehicle 1 and the electronic arrangement 30 of the apparatus 10.

Figure 2:
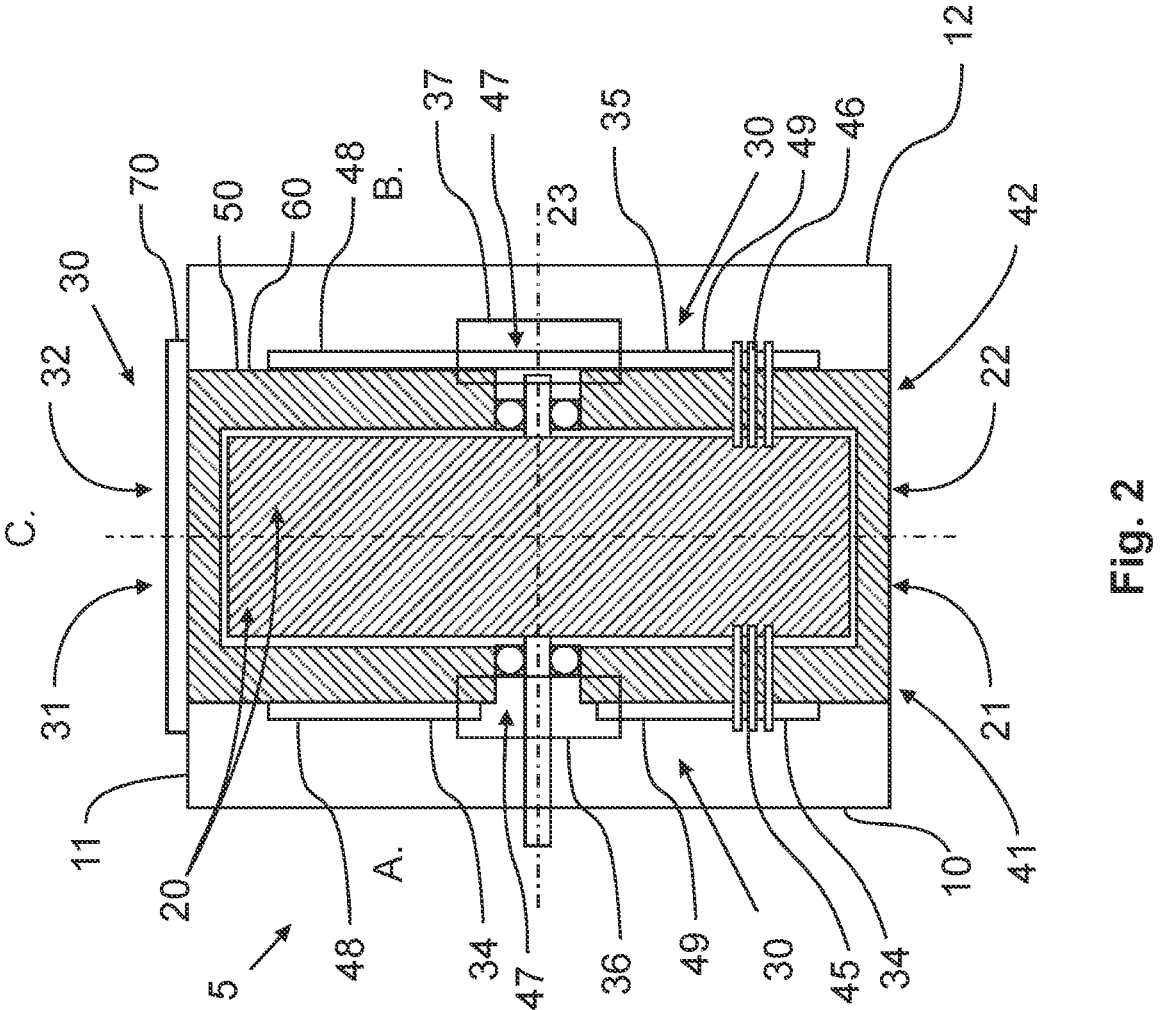
FIG. 2 is another schematic representation of the inventive electric apparatus.

In FIG. 2, the inventive electric apparatus 10 is shown with more details, while three different sides A, B and C are highlighted. The electric apparatus 10 can comprise at least one electric machine 20, so that the different sides A, B and C can be understood as outer sides of the at least one electric machine 20. In this specific embodiment, the at least one electric machine 20 comprises two electric machines 21, 22 to redundantly provide a steering assist force for providing steering assistance. The electric machines 21, 22 are arranged adjacent to each other, so that the different sides A, B and C are outer sides of this assembly of two electric machines 21, 22.

Furthermore, an electronic arrangement 30 is provided at least for controlling the electric machines 20. The electronic arrangement 30 can comprise redundant functional components 41, 42 for providing a controlling of the electric machines 20 for the generation of the steering assist force by a control circuit 48 and supplying electric power to the electric machines 20 by a power circuit 49. Another function can be the monitoring of the electric machines 20 by at least one motor position sensor 47.

As shown in FIG. 2, the electric machines 20 and the electronic arrangement 30 form a single common assembly unit for being mounted on the vehicle 1. This can simplify and improve the above-mentioned assembly process. The electronic arrangement 30 is arranged on at least two different sides A, B of the electric machines 20 to enable a more compact and flexible design of the electric apparatus 10.

The electronic arrangement 30 can provide "power and command" function, as the power supply or the control for the electric machines 20. The functional components required for this reason can be arranged on at least one circuit board. The electric machine 20 can provide a redundant phase interface to the at least one "Power and Command" circuit board. The power and command functions can be divided in two distinct parts linked by the electric machines 20. In other words, on a first side A of the electric machines 20 a first part of the electronic arrangement 30, and on a second side B of the electric machines 20 a second part of the electronic arrangement 30 is arranged, linked by the electric machines 20. The first part can also be referred to as first control unit 31 and the second part can also be referred to as second control unit 32.

The first control unit 31 can comprise first components 41 like a control circuit 48 and/or a power circuit 49 located in a first control board area 34 and/or a motor position sensor 47 located in a first motor position sensor area 36. The second control unit 32 can comprise second components 42 like a control circuit 48 and/or a power circuit 49 located in a second control board area 35 and/or a motor position sensor 47 located in a second motor position sensor area 37. For providing the power functions, i.e. particularly a power supply for the electric machines 20, the power circuits 49 can each be designed as power stage with corresponding electrical power components. Each control circuit 48, on the other hand, can comprise at least one electronic control device, for example a microprocessor or the like. The control units 31, 32, particularly electronic control units 31, 32, can preferably fully provide the functionality that is commonly provided by an ECU on top of the electric machine 20.

Therefore, according to the invention, it is possible that an additional ECU on top of the electrical machine 20 can be omitted.

The first components 41 are configured to provide the functions for a first electric machine 21 of the redundant electric machines 20, and the second components 42 are configured to provide the functions for a second electric machine 22 of the redundant electric machines 20, wherein the first components 41 are arranged on a first side A of the different sides A, B adjacent to the first electric machine 21 and the second components 42 are arranged on a second side B of the different sides A, B adjacent to the second electric machine 22.

The components 41, 42 can be connected to the electric machines 20 using a first electric machine connection 45 for the first components 41 and a second electric machine connection 46 for the second components 42. For the data exchange and/or the control of the control units 31, 32, a connector unit like a connector plate 70 can be used and divided in sub elements for being placed anywhere around the electric apparatus 10 or electric machine 20 respectively. In the shown embodiment, the connector plate 70 is arranged on top of the electric machine 20 on a third side C. The connector plate 70 may be coupled to the motor housing 60 and/or the apparatus housing 11, 12 by, for example, screwing or gluing, particularly with a not explicitly shown sealing element like an elastic sealing ring.

The electric machine phases can be divided between each command blocks. This way, the control- and power circuits, particularly the corresponding printed circuit boards (PCBs) and electronic components of the electronic arrangement 30 can be set as close as possible to the electric machine 20. A specific separate heatsink, which can be mandatory in common designs for such an apparatus, can be no longer required according to the invention since a motor housing 60 can be used as heatsink 50 for both power stages. Therefore, the at least one heatsink 50 for the electronic arrangement 30 is distributed around the electric machine 20 for dividing a heat dissipation at least or exactly in two distinct areas of the electric apparatus 10 on the different sides A, B.

It is possible that the components 41, 42 of the electronic arrangement 30 are arranged on at least one PCB. Preferably, at least or exactly one first PCB with the first components 41 is arranged on the first side A and at least or exactly one second PCB is arranged on the second side B. Each of the PCBs can be heat conductively connected to the motor housing 60, particularly screwed to ensure the thermal contact. The motor position sensors 47 can be arranged along the motor shaft of the electric machine 20 on one or both PCBs. Between the connector unit, particularly connector plate 70, and the at least one PCB a mechanical and electrical connection can be provided. The mechanical connection can be provided by screwing or gluing or the like. The electrical connection can be a soldering or pressfit connection.

Furthermore, also the two PCBs can communicate with each other, and therefore comprise an electrical connection with each other, as for example a wired or wireless or opto-electronic connection.

Each electric machine 20 can be driven by fully comprehensive electronic stages, including power and command. The electronics of the electric apparatus 10 can be considered as being (fully) inside the assembly unit. The electric apparatus 10 can further comprise a cover, particularly housing, 11, 12 surrounding at least the electric machines 20 and the electronic arrangement 30 for forming the assembly unit. In other words, the entire arrangement of the inventive apparatus 10 can be encapsulated in the covers 11, 12. The covers 11, 12 can be made of a plastic or metallic material.

The two different sides A, B between which the electric machines 20 are arranged are designed as opposite sides of the electric machines 20 along a motor shaft axis 23 or orthogonal to this axis 23.

Figure 3:
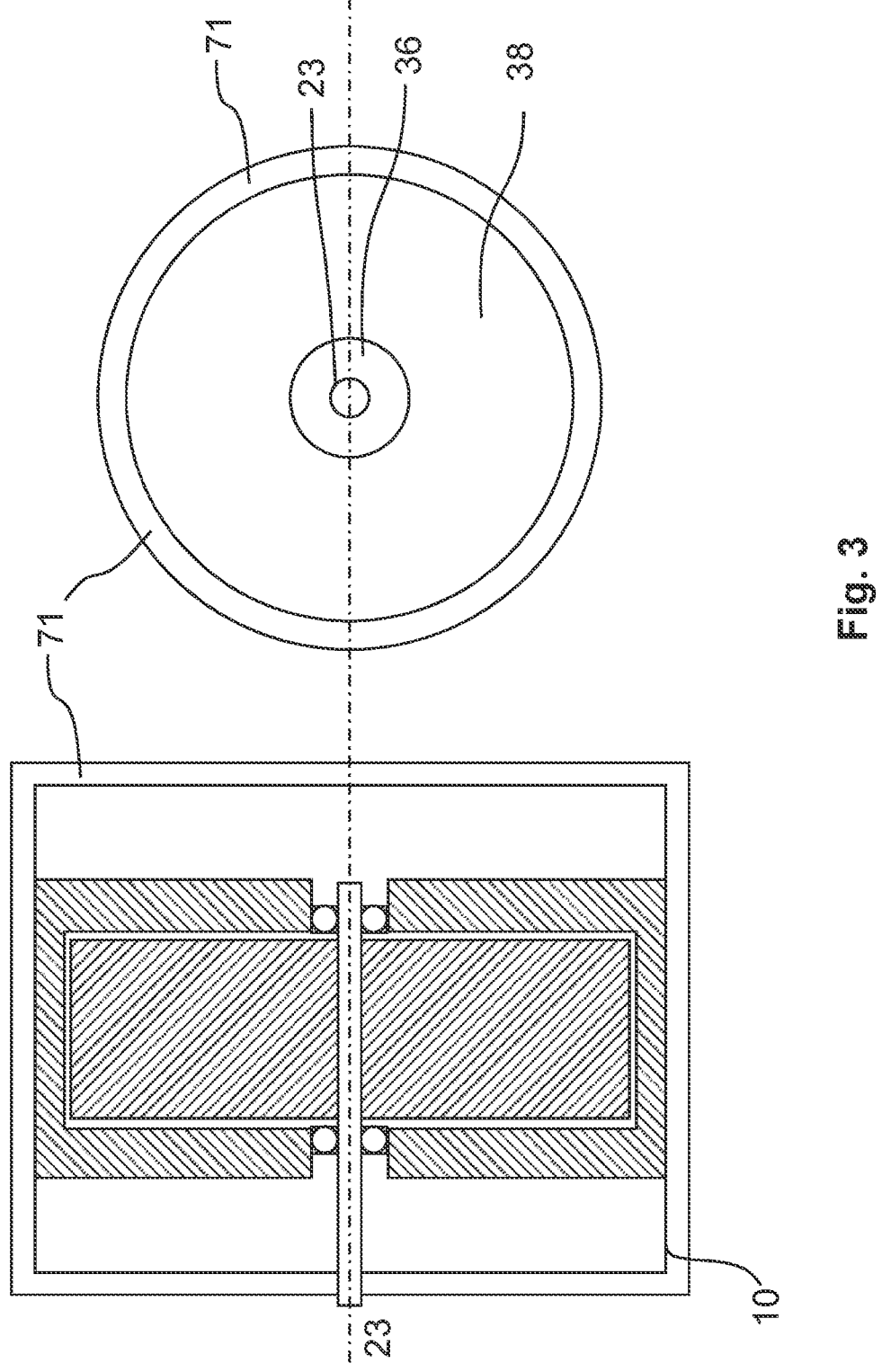
FIG. 3 is another schematic representation of the inventive electric apparatus.

The invention can cover every embodiment, for which the electronic arrangement 30 is distributed around the electric machine 20 and the connectors of a connector unit like the connector plate 70 are placed around it. Possible locations for the arrangement of parts of the electronic arrangement 30 and/or the connector unit are shown in FIG. 3. In this figure, a projected surface of the inventive apparatus 10 is shown, so that the illustration on the right side shows a side view of the illustration on the left side. The possible locations are provided in the areas 36, 38 and 71, particularly in an electronic and motor position area 38, preferably for the control circuit 48 and/or the power circuit 49 and/or at least partially the electric machine 20, and/or in a motor position sensor area 36 for the motor position sensor 47. Also, a connector plate position area 71 is shown for possible locations of the connector unit.

The preceding explanation of the embodiments describes the present invention exclusively in the context of examples. Of course, individual features of the embodiments can be freely combined with each other without leaving the scope of this invention.

REFERENCE SIGNS 1 vehicle
5 electric power steering system
10 electric apparatus
11 first cover
12 second cover
20 electric machine
21 first electric machine
22 second electric machine
23 motor shaft axis
30 electronic arrangement
31 first control unit
32 second control unit
34 control board area, first control board area
35 second control board area
36 motor position sensor area, first sensor area
37 second sensor area
38 electronic and motor position area
41 first components
42 second components
45 first electric machine connection
46 second electric machine connection
47 motor position sensor
48 control circuit
49 power circuit
50 heatsink
60 motor housing
70 connector plate
71 connector plate position area
11,12 apparatus housing
A first side
A, B different sides
B second side
C third side

We claim:

1. An electric apparatus for an electric power steering system of a vehicle, the electric apparatus comprising:

at least one electric machine, wherein the at least one electric machine includes a first outer side (A), a second outer side (B) positioned opposite the first outer side (A) along a motor shaft axis or orthogonal to the motor shaft axis, and a third outer side (C) extending between the first outer side (A) and the second outer side (B);

an electronic arrangement at least for controlling the at least one electric machine, the electronic arrangement comprising a control circuit configured to control the at least one electric machine and a power circuit configured to supply electric power to the at least one electric machine; and at least one connector plate for providing an electric interface to the electronic arrangement, the at least one connector plate positioned on the third outer side (C) of the at least one electric machine, wherein the at least one electric machine and the electronic arrangement form a single common assembly unit for being mounted on the vehicle, and wherein the electronic arrangement is arranged on at least the first outer side (A) and the second outer side (B) of the at least one electric machine.

2. The electric apparatus according to claim 1, wherein the electric apparatus is an electric power steering apparatus for assisting a handle operation of a driver of the vehicle, and wherein the at least one electric machine generates a steering assist force for assisting the handle operation, and the electronic arrangement controls generation of the steering assist force.

3. The electric apparatus according to claim 1, wherein the electronic arrangement is distributed around the at least one electric machine within the electric apparatus.

4. The electric apparatus according to claim 1, wherein the at least one electric machine comprises a first electric machine and a second electric machine to redundantly provide a steering assist force for providing steering assistance, wherein the electronic arrangement is a first electronic arrangement comprising a first control circuit and a first power circuit, wherein the electric apparatus further comprises a second electronic arrangement, the second electronic arrangement comprising a second control circuit and a second power circuit, and wherein the first electronic arrangement and the second electronic arrangement redundantly provide the following functions:

controlling the first electric machine and the second electric machine for generating the steering assist force by the first control circuit and the second control circuit, respectively, and supplying electric power to the first electric machine and the second electric machine by the first power circuit and the second power circuit, respectively.

5. The electric apparatus according to claim 4, wherein the first electronic arrangement provides functions for the first electric machine, and the second electronic arrangement provides functions for the second electric machine, wherein the first electronic arrangement is arranged on the first outer side (A) adjacent to the first electric machine and the second electronic arrangement is arranged on the second outer side (B) adjacent to the second electric machine.

6. The electric apparatus according to claim 4, wherein the first electronic arrangement comprises a first motor position sensor for monitoring the first electric machine and the second electronic arrangement comprises a second motor position sensor for monitoring the second electric machine.

7. The electric apparatus according to claim 1, wherein at least one mechanical part of the at least one electric machine provides a heatsink for the electronic arrangement.

8. The electric apparatus according to claim 1, wherein at least one heatsink for the electronic arrangement is distrib-uted around the at least one electric machine for dividing a heat dissipation at least or exactly in two distinct areas of the electric apparatus on the first and second outer sides (A, B).

9. The electric apparatus according to claim 1, further including a housing surrounding at least the at least one electric machine and the electronic arrangement for forming the assembly unit.

10. The electric apparatus according to claim 1, wherein the electronic arrangement further comprises a motor posi-tion sensor.

\* \* \* \* \*